United States Patent
Li et al.

(10) Patent No.: US 10,157,314 B2
(45) Date of Patent: Dec. 18, 2018

(54) AERIAL IMAGE PROCESSING

(71) Applicant: PANTON, INC., Houston, TX (US)

(72) Inventors: Saishi Frank Li, Sugar Land, TX (US); Guoyan Cao, Houston, TX (US); Yang Liu, Katy, TX (US); Jack Dong Wang, Sugar Land, TX (US); Mingyang Zhu, Missouri City, TX (US)

(73) Assignee: PANTON, INC., Houston, TX (US)

( * ) Notice: Subject to any disclaimer, the term of this patent is extended or adjusted under 35 U.S.C. 154(b) by 324 days.

(21) Appl. No.: 15/010,740

(22) Filed: Jan. 29, 2016

(65) Prior Publication Data

US 2018/0107874 A1   Apr. 19, 2018

(51) Int. Cl.

| | |
|---|---|
| *G06K 9/00* | (2006.01) |
| *G06N 3/08* | (2006.01) |
| *G06K 9/62* | (2006.01) |
| *G06K 9/54* | (2006.01) |
| *G06K 9/20* | (2006.01) |
| *G06T 7/60* | (2017.01) |
| *G06K 9/46* | (2006.01) |
| *G06K 9/38* | (2006.01) |
| *G01S 19/42* | (2010.01) |
| *G06T 7/11* | (2017.01) |

(52) U.S. Cl.
CPC ....... *G06K 9/00637* (2013.01); *G06K 9/0063* (2013.01); *G06K 9/2027* (2013.01); *G06K 9/38* (2013.01); *G06K 9/4604* (2013.01); *G06K 9/54* (2013.01); *G06K 9/6218* (2013.01); *G06K 9/6256* (2013.01); *G06K 9/6267* (2013.01); *G06N 3/08* (2013.01); *G06T 7/60* (2013.01); *G01S 19/42* (2013.01); *G06T 7/11* (2017.01); *G06T 2207/10032* (2013.01)

(58) Field of Classification Search
CPC .......... G06K 9/00797; G06K 9/00196; G06K 9/00718; G06K 9/00744; G06K 9/6269; G06K 9/00637; G06K 9/6267; G06T 2207/10012; G06T 7/0075; G06N 3/08; G06N 5/04; G06F 17/30858; G06F 17/30784; H04N 13/0239
See application file for complete search history.

(56) References Cited

U.S. PATENT DOCUMENTS

| | | | |
|---|---|---|---|
| 2010/0278420 A1* | 11/2010 | Shet | G06K 9/00369 382/156 |
| 2014/0201126 A1* | 7/2014 | Zadeh | G06K 9/627 706/52 |
| 2017/0061625 A1* | 3/2017 | Estrada | G06T 7/0042 |
| 2017/0076616 A1* | 3/2017 | Kanade | G08G 5/045 |

(Continued)

*Primary Examiner* — Amir Alavi
(74) *Attorney, Agent, or Firm* — Patterson & Sheridan LLP (57) ABSTRACT

Methods for aerial image processing and object identification using an electronic computing device are presented, the methods including: causing the electronic computing device to build a deep learning model; receiving actual aerial image data; applying the deep learning model to the actual aerial image data to identify areas of interest; post-processing the areas of interest; and returning a number of classified objects corresponding with the areas of interest to a user. In some embodiments, methods further include: applying global positioning system (GPS) mapping to the number of classified objects with respect to the actual aerial image data.

16 Claims, 6 Drawing Sheets

(56) References Cited

U.S. PATENT DOCUMENTS

2017/0094527 A1\* 3/2017 Shattil .................... H04W 12/12
2017/0185841 A1\* 6/2017 Liu ..................... G06K 9/00718
2017/0316311 A1\* 11/2017 Pilly ........................ G06N 3/08
2017/0371897 A1\* 12/2017 Strong .............. G06F 17/30241

\* cited by examiner

AERIAL IMAGE PROCESSING

BACKGROUND

Conventionally, aerial imagery was captured with manned vehicles such as airplanes and helicopters or with unmanned devices such as balloons. With respect to airplanes, the cost of image acquisition was very high as the maintenance and operation of an aircraft is typically very high. While balloons offered a much lower cost, balloons have very limited maneuverability and are very much dependent on weather conditions. Indeed, some industries, such as oil and gas, must meet Federal regulatory requirements for monitoring pipelines and have, up and until recently been forced to maintain expensive acquisition systems. However, this paradigm is changing.

With the rapid development of Unmanned Aerial Vehicle (UAV) or drone technologies in recent years, the cost of acquisition has significantly lowered while maneuverability has remained very high. Thus, unlike airplanes, maintaining and operating UAVs is relatively inexpensive. In addition, unlike balloons, UAVs are highly maneuverable and less reliant on weather conditions. The advent of UAV appears to be a boon to industries requiring aerial imagery. Unfortunately, commensurate with the low cost of acquisition is that unprecedented amount of image data and numerical data is being captured. Industry estimation suggests that this trend will continue exponentially so the amount of acquired data is staggering.

In order to realize the gains in economic efficiency and the commensurate data increase, processing aerial image data to render usable data is critical. Conventionally, aerial image data may have been manually analyzed. However, manual methods are tedious and cannot keep pace with the volume of data being acquired. There are some algorithms that may sharpen or refine images, but these algorithms are often applied haphazardly by a user not conversant with the subtleties and limitations of these tools.

As such, aerial image processing is presented herein.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for aerial image processing and object identification using an electronic computing device are presented, the methods including: causing the electronic computing device to build a deep learning model; receiving actual aerial image data; applying the deep learning model to the actual aerial image data to identify areas of interest; post-processing the areas of interest; and returning a number of classified objects corresponding with the areas of interest to a user. In some embodiments, methods further include: applying global positioning system (GPS) mapping to the number of classified objects with respect to the actual aerial image data. In some embodiments, the electronic computing device to build a deep learning model includes: receiving a number of training images, the training images including a number of known objects; pre-processing the number of training images to clean and texture map the number of training images; and building the deep learning model. In some embodiments, pre-processing the number of training images includes: applying brightness control to the number of training images; applying edge detection to the number of training images; and applying texture filtering to the number of training images. In some embodiments, methods further include: building the deep learning model includes: receiving the pre-processed number of training images; applying a convolutional neural network for object detection; and storing the deep learning models. In some embodiments, receiving the actual aerial image data includes: receiving a number of actual aerial image stacks; receiving GPS coordinate data corresponding with the number of actual aerial image stacks; receiving survey data corresponding with the number of actual aerial image stacks; and compiling the actual aerial image data. In some embodiments, the post-processing the areas of interest includes: clustering the areas of interest; applying surface area segmentation to the areas of interest; and classifying the areas into objects proximate with an associated pipeline. In some embodiments, applying GPS mapping to the number of classified objects includes: mapping GPS data to the number of actual aerial image stacks; calculating distances between the number of classified objects; calculating surface areas of the number of classified objects; and returning distances between the number of classified objects and the associated pipeline.

In other embodiments, methods for aerial image processing and object identification associated with a pipeline using an electronic computing device are presented, the methods including: causing the electronic computing device to build a deep learning model; receiving actual aerial image data; applying the deep learning model to the actual aerial image data to identify areas of interest; post-processing the areas of interest; and returning a number of classified objects corresponding with the areas of interest. In some embodiments, methods further include: applying global positioning system (GPS) mapping to the number of classified objects with respect to the actual aerial image data and the pipeline.

In other embodiments, computing device program product for image processing and object identification using a computing device are presented, the computing device program product including: a non-transitory computer readable medium; first programmatic instructions for causing the electronic computing device to build a deep learning model; second programmatic instructions for receiving actual aerial image data; third programmatic instructions for applying the deep learning model to the actual aerial image data to identify areas of interest; fourth programmatic instructions for post-processing the areas of interest; and fifth programmatic instructions for returning a number of classified objects corresponding with the areas of interest to a user, where the programmatic instructions are stored on the non-transitory computer readable medium.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals/per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
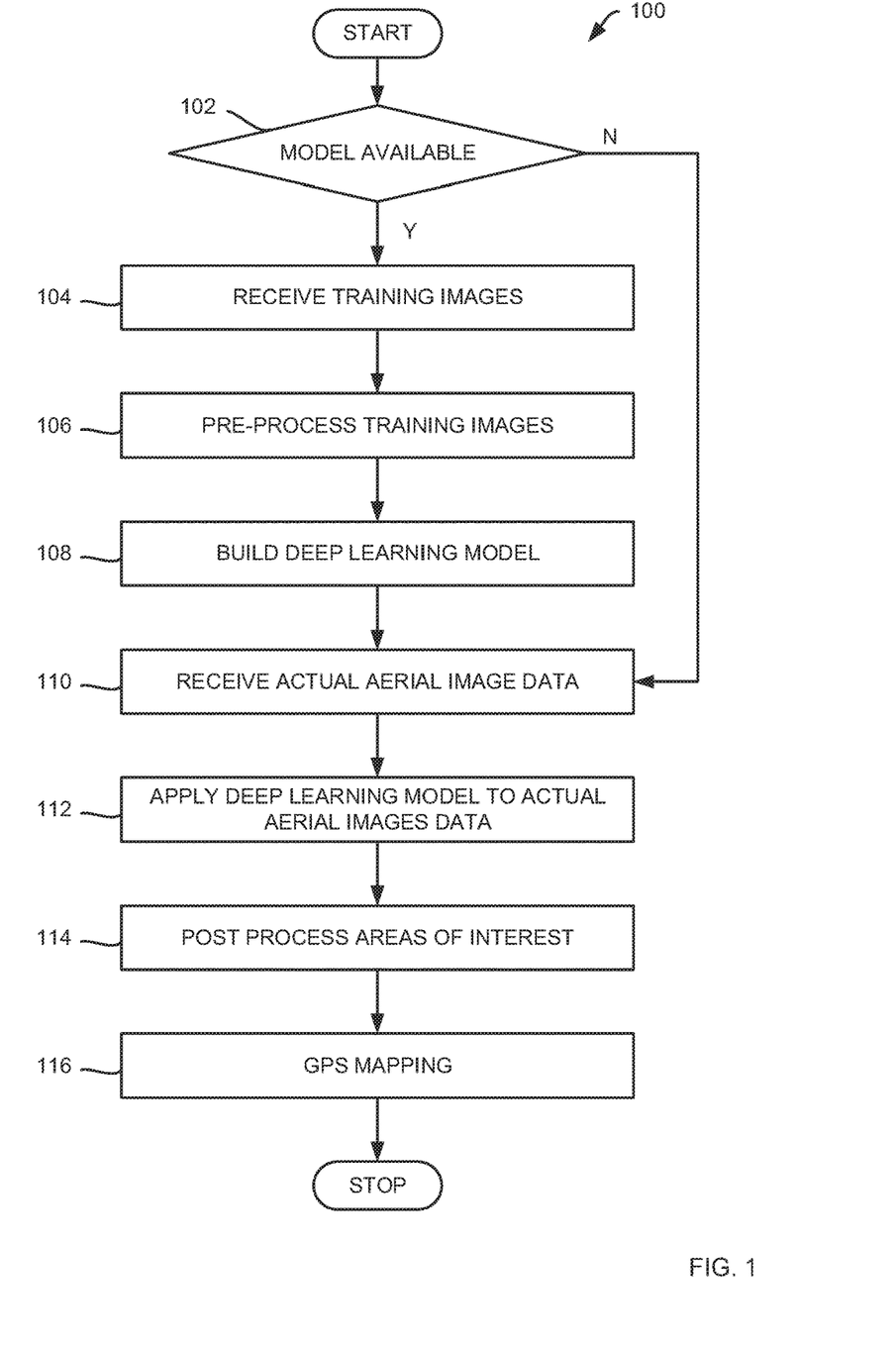
FIG. 1 is an illustrative flowchart of an overview of methods for aerial image processing in accordance with embodiments of the present invention.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks FIG. 1 is an illustrative flowchart 100 of an overview of methods for aerial image processing in accordance with embodiments of the present invention. In general, methods provided herein occur in two conceptual stages. The first stage is model building. In model building, the method receives training images and builds a model. In a second stage, the model is used to classify objects found in actual images. As such, at a first step 102, the method determines whether a model is available. If the method determines at a step 102 that a model is available, the method continues to a step 110. If the method determines at a step 102 that a model is not available, the method continues to a step 104 to begin the first conceptual stage of methods provided herein. At a step 104, the method received training images. Training images, as contemplated herein, may include a series of images or image stacks that contain any number of known objects. In embodiments, known objects may include, without limitation any structure, plant, landmark, or any other identified object in an image whether permanent or transient. Details such as roof composition or landscape features may also be known objects in embodiments. At a next step 106, the method pre-processes training images. At this step, images may be cleaned and texture mapped in embodiments provided herein. Pre-processing training images may prepare images by filtering and is discussed in further detail below for FIG. 2. At a next step 108, the method builds a deep learning model. In embodiments, a convolutional neural network may be applied to training images to build a learning model. Deep learning models will be discussed in further detail below for FIG. 3.

Once a deep learning model is built, methods may begin a second conceptual stage as noted above. As such, at a step 110, the method receives actual aerial image data. Image data may be received as images stacks or, in other words, a series of partially overlapping images. Methods for receiving actual aerial image data will be discussed in further detail below for FIG. 4. At a next step 112, the method applies a deep learning model such as built above for a step 108 to the actual aerial images. By utilizing a deep learning model in embodiments provided herein, image may efficiently and effectively processed. At a next step 114, the method post-processes areas of interest—that is, areas of actual aerial images that are under examination. In general, post-processing results in classification of objects. In some embodiments, post-processing results in classification of objects near a pipeline. Post-processing will be discussed in further detail below for FIG. 5. At a next step 116, the method performs GPS mapping to quantify image data whereupon the method ends. GPS mapping will be discussed in further detail below for FIG. 6.

Figure 2:
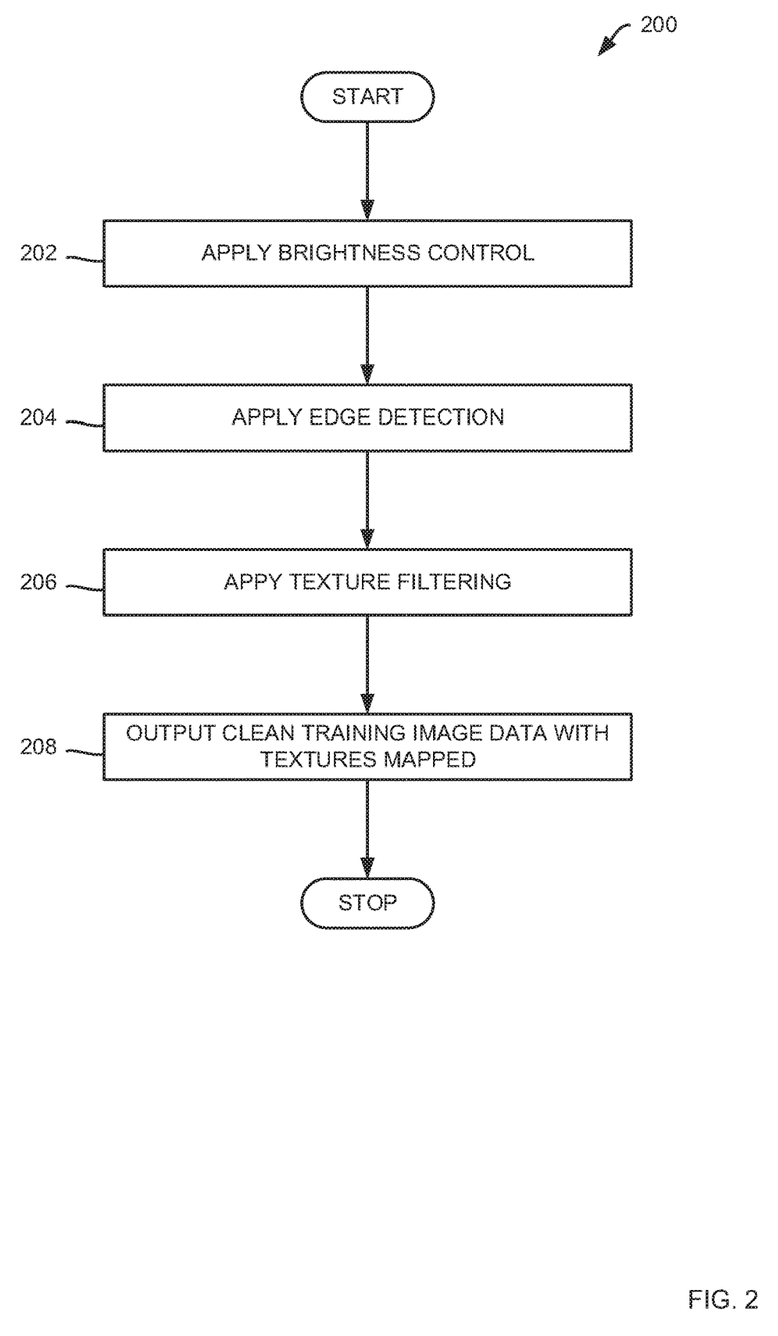
FIG. 2 is an illustrative flowchart of methods for pre-processing in accordance with embodiments of the present invention.

FIG. 2 is an illustrative flowchart 200 of methods for pre-processing in accordance with embodiments of the present invention. In particular, flowchart 200 provides further clarification for a step 106, FIG. 1. As noted above, methods include at least two conceptual stages. Pre-processing occurs during a model building stage. As such, at first step 202, the method applies a brightness control filter. As utilized herein, brightness refers to the gray level of an image, which is a measurement of the pixel intensity. In operation, brightness control filter parameters may be established so that gray level images are converted to binary images based on global image thresholds calculated by Otsu's method. Otsu's method assumes that an image contains two classes of pixels following bi-modal histogram (foreground pixels and background pixels). The method then calculates the optimum threshold separating the two classes so that their combined spread (intra-class variance) is minimal, or equivalently (because the sum of pair wise squared distances is constant), so that their inter-class variance is maximal. At a next step 204, the method applies edge detection. In general, edge detection serves to define an edge based on the property that intensity changes rapidly around the edge of an object. In operation, edge control parameters may proceed by Canny edge detection, which may be broken down to at least five different steps: a) Apply Gaussian filter to smooth the image in order to remove the noise; b) Find the intensity gradients of the image; c) Apply non-maximum suppression to get rid of spurious response to edge detection; d) Apply double threshold to determine potential edges; and e) Track edge by hysteresis—Finalize the detection of edges by suppressing all the other edges that are weak and not connected to strong edges.

At a next step 206, the method applies texture filtering. As utilized herein, texture analysis quantifies the image roughness, smoothness, bumpiness, etc. by measuring the spatial variation in pixel intensities of an image. In operation, range filtering and standard deviation filtering may be utilized. Range filtering defines a neighborhood around a pixel of interest and calculates the range for the neighborhood to determine the output of the pixel. Standard deviation filtering defines a neighborhood around the pixel of interest and calculates the statistics for the neighborhood to determine the output of the pixel. Once filtering is applied, the method continues to a step 208 to output clean training image data with textures mapped for input into a deep learning model whereupon the method ends. It may be appreciated that some advantages may be achieved by processing images in the order presented. However, the order of processing should not be construed as limiting in embodiments provided herein. Furthermore and without being bound by theory, it has been found that these algorithms utilized in combination are particularly useful in distinguishing objects in an aerial image.

In addition to those steps illustrated, in embodiments other filtering may be applied without limitation such as, for example, Hough transformation, Gabor filtering, and Fourier Transformation. A Hough transformation is used to detect the straight lines in an image and rotate lined-objects to be horizontal or vertical oriented. Gabor filtering is a method for providing a set of frequency filters and orientation filters to extract an object out of background. A Fourier transformation is used to recognize the frequency patterns of the pixel intensity to recognize objects out of background. Utilizing any or all of these filtering algorithms may result in a cleaner, more defined image for use in building a deep learning model as discussed below.

Figure 3:
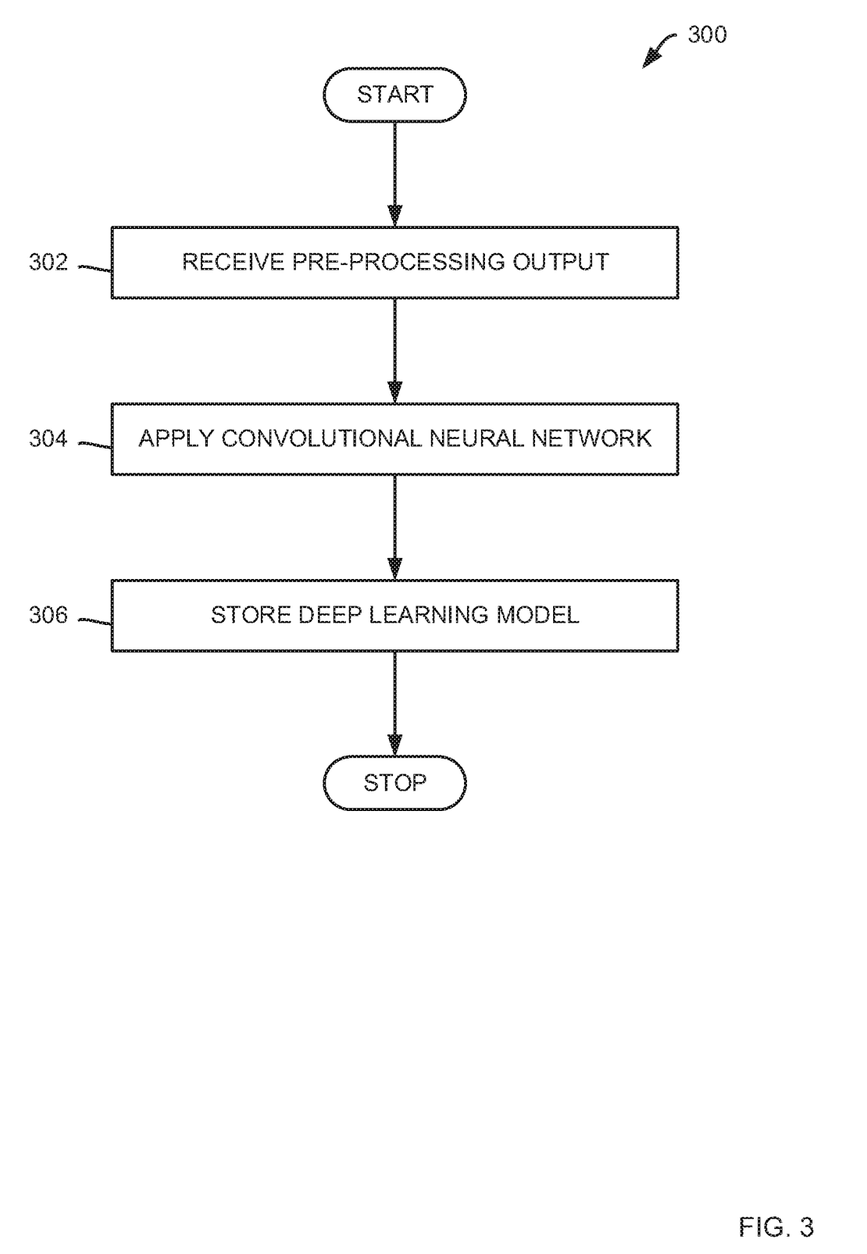
FIG. 3 is an illustrative flowchart of methods for building a deep learning model in accordance with embodiments of the present invention.

FIG. 3 is an illustrative flowchart 300 of methods for building a deep learning model in accordance with embodiments of the present invention. In particular, flowchart 300 provides further clarification for a step 108, FIG. 1. At a first step 302, the method receives pre-processing output such as, for example, from a step 106. Pre-processing output may be received in any manner known in the art without departing from embodiments provided herein. At a next step 304, a convolutional neural network is applied. In general, a convolutional neural network is a type of feed-forward artificial neural network where the individual neurons are tiled in such a way that they respond to overlapping regions in the visual field. In embodiments, a convolutional neural network may be updates by methods such as Region Proposal Network (RPN) and Deformable Part Models (DPM) which may improve speed and detection in some examples. At a next step 306, the method stores the deep learning model. A single model may, in some embodiments, suffice. However, multiple models may be generated as needed in embodiments. Further, in embodiments, the deep learning model may be stored in any suitable storage manner known in the art without limitation. The method then ends.

Figure 4:
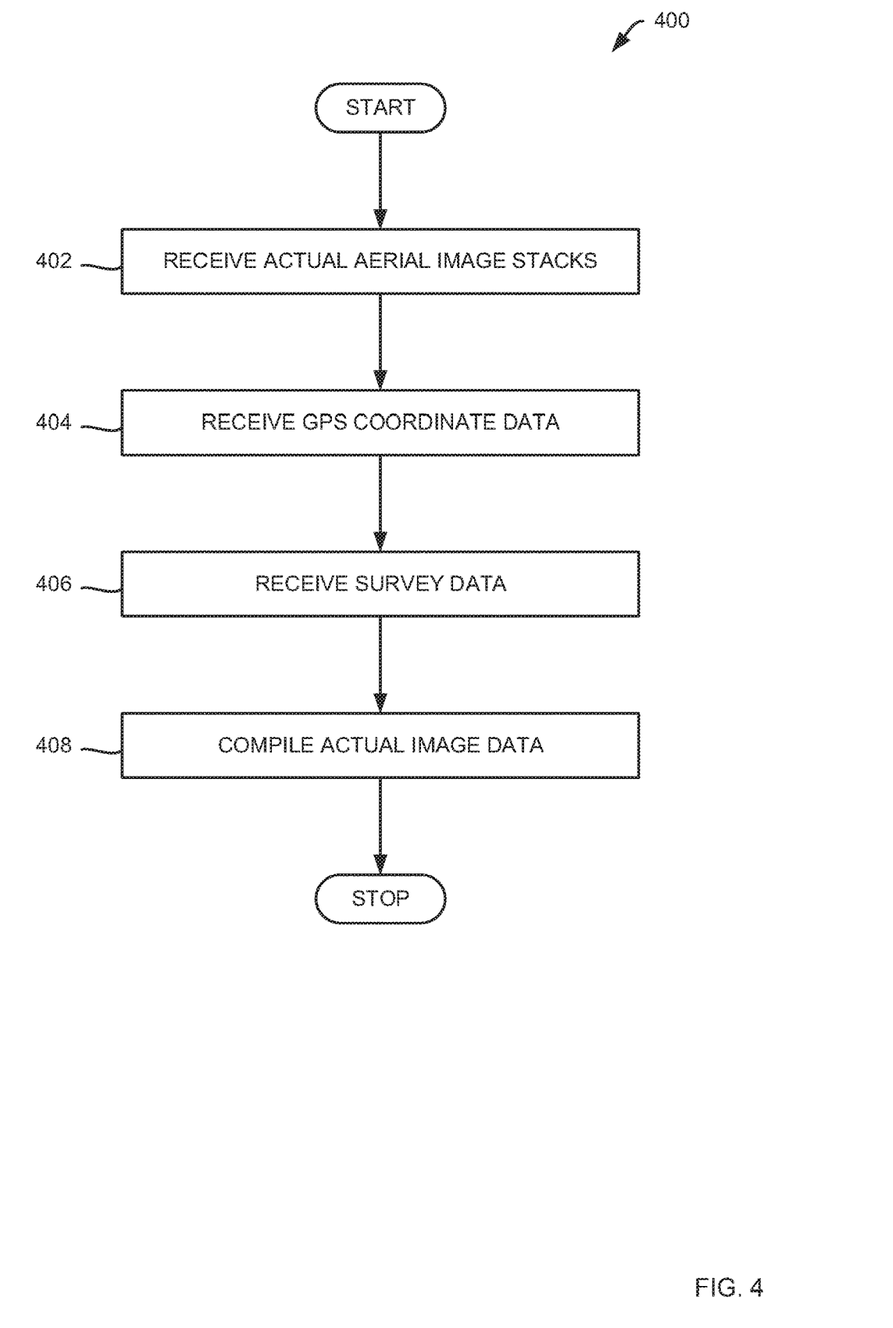
FIG. 4 is an illustrative flowchart of methods for receiving actual image data in accordance with embodiments of the present invention.

FIG. 4 is an illustrative flowchart 400 of methods for receiving actual image data in accordance with embodiments of the present invention. In particular, flowchart 400 provides further clarification for a step 110, FIG. 1. Receiving actual image data in embodiments provided herein may include receiving images and associated data as detailed following. As such, at a step 402, the method receives actual aerial images stacks. Actual aerial image stacks may include any number of partially overlapping or non-overlapping aerial images in embodiments. In addition, actual aerial images may be acquired from any known source including, for example, manned or unmanned air vehicles, satellite images, image collections, and image databases without limitation. At a next step 404, the method receives global positioning system (GPS) coordinate data corresponding with the actual aerial image stacks received. At a next step 406, the method receives survey data corresponding with the actual aerial image stacks received, whereupon the method compiles actual image data at a step 408. That is, the method associates relevant positioning and survey data with actual images so that a coordinate system may be generated at later step. Survey data may include, for example, above and below ground features such as pipelines, water mains, sewage conduits, etc.

Figure 5:
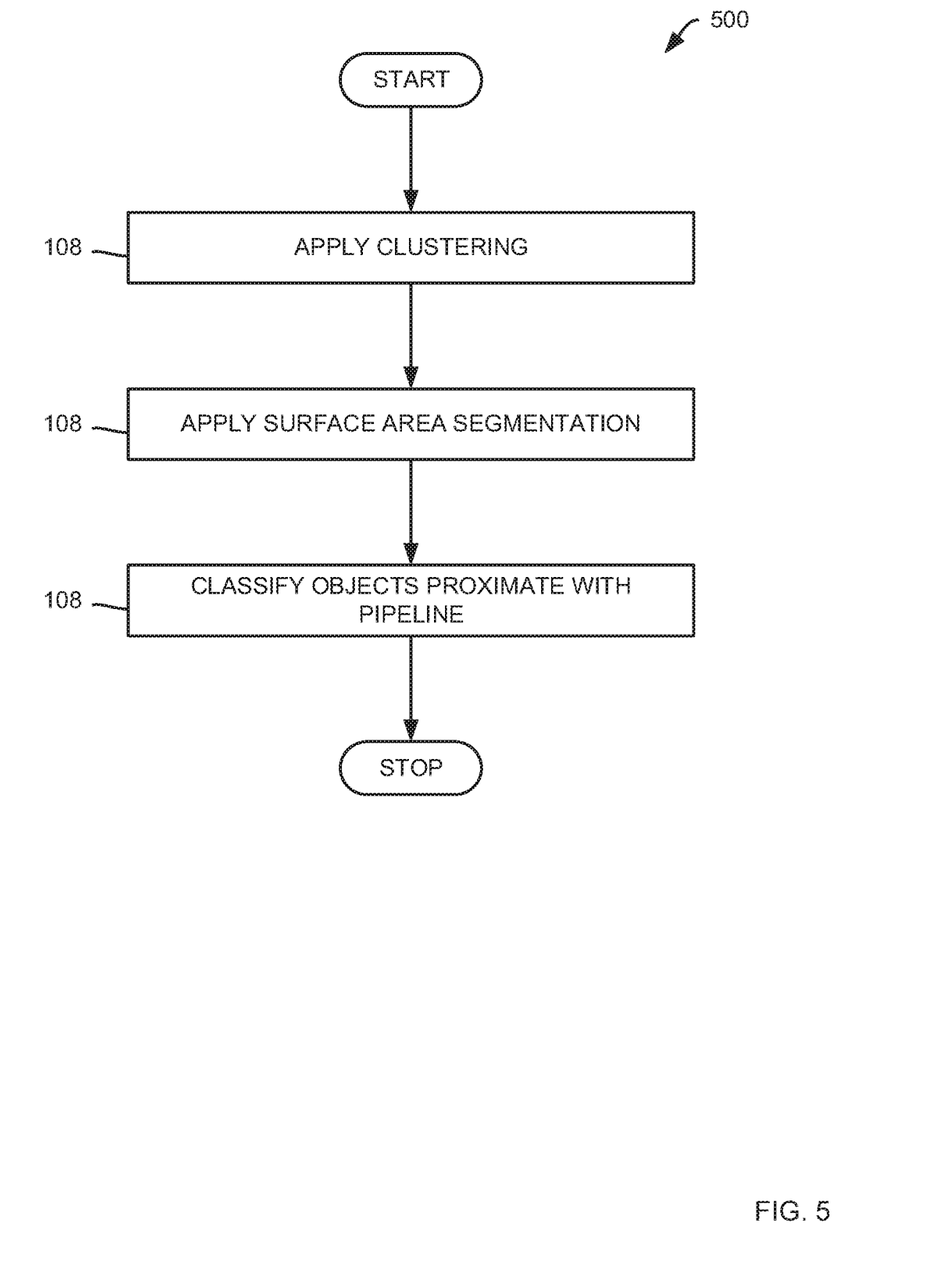
FIG. 5 is an illustrative flowchart of methods for post-processing in accordance with embodiments of the present invention.

FIG. 5 is an illustrative flowchart 500 of methods for post-processing in accordance with embodiments of the present invention. In particular, flowchart 500 provides further clarification for a step 114, FIG. 1. As such, at a first step 502, the method applies clustering to actual area image data. In clustering, the color in an image is represented by a ratio combination of red, green, and blue intensity. Close color objects may be grouped according to the distances of pixel intensity in 3-dimensional space coordinated by red, green, and blue. In operation, a k-means clustering algorithm may be utilized to group close color objects where the size of groups ranges from approximately 15-30. At a next step 504, the method applies surface area segmentation to actual area image data. By using non-visual data such as altitude, camera specifications, and image file information, surface areas of detected objects may be calculated. In operation, objects with smaller surface area may be categorized as vehicles. Objects with a larger surface area may be categorized as houses. At a next step 506, the method classifies objects whereupon the method ends. In operation, methods may utilize surface area data to determine a likelihood of whether detected objects are houses or vehicles. It may be useful, in some embodiments, to classify objects in relation to some feature of interest such as a pipeline, for example. In those examples, a pipeline owner may wish to monitor the objects near a pipeline to determine whether a hazardous condition exists or to monitor maintenance work on a pipeline. It may be appreciated that such monitoring may be required under Federal regulations. It is often difficult to distinguish vehicles and structures near a pipeline as the area may at once be heavily or sparsely populated making identification difficult. Utilizing methods provided herein, objects may be classified which would otherwise require tedious examination of aerial photographs.

Figure 6:
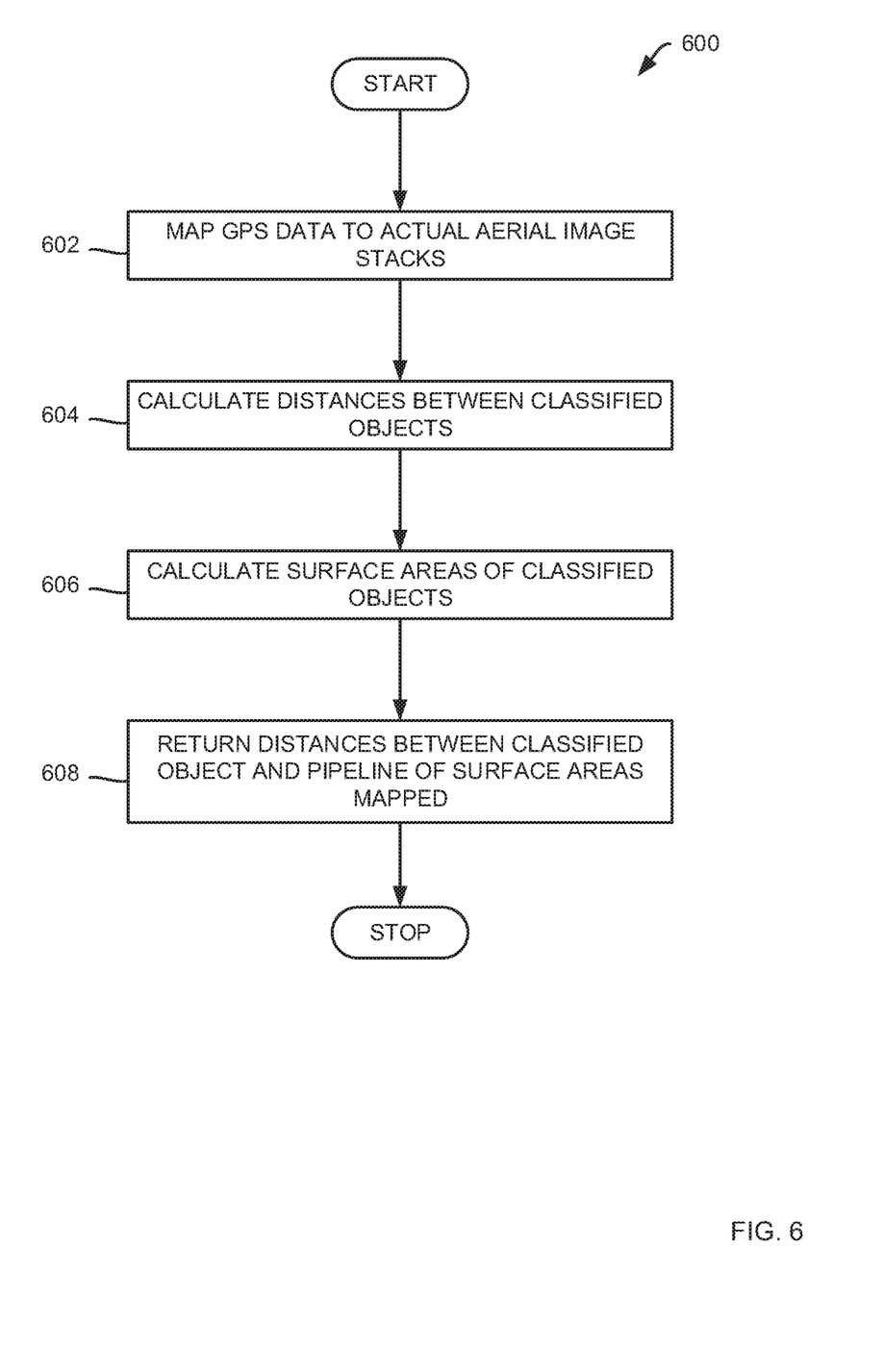
FIG. 6 is an illustrative flowchart of methods for GPS mapping in accordance with embodiments of the present invention.

FIG. 6 is an illustrative flowchart 600 of methods for GPS mapping in accordance with embodiments of the present invention. In particular, flowchart 600 provides further clarification for a step 116, FIG. 1. As such, at a step 602, the method maps GPS data to actual aerial image stacks. By using the GPS coordinates of the image location and the azimuth of the moving aerial vehicle/camera, every pixel within the images can be GPS tagged. Due to the sensitivity of GPS coordinates, the calculation is accurate up to 8 decimal places. Combining GPS tagged images with the original underground pipeline coordinates, underground pipelines which are invisible in the images can be accurate mapped within 5 feet onto the images. In operation, geometric earth estimation is used by the following standard: semimajor axis=6378137m, semiminor axis=6356752.31424518m, and flattening coefficient=1/298.257223563. At a next step 604, the method calculates distances between classified objects. Using the object detection from convolutional neural network and the coordinate-based calculation along with altitude and camera specifications, distances between a pipelines (or surveyed objects) and detected objects in the images may be calculated. At a next step 606, the method calculates surface areas of classified objects. Calculated surface areas may provide further data regarding conditions surround a selected feature such as a pipeline, for example. At a next step 608, the method returns distances between classified objects and pipelines of the surface areas mapped whereupon the method ends.

In embodiments, the resulting data may detect anomalous objects in frames. Furthermore, embodiments may provide object detection regardless of weather conditions. The selected application of filters allow for discerning between shadows regardless of time of day. Furthermore, in embodiments, detection may be robust up to as much as 30 degrees of inclination which may allow for a wider surface scan in some cases.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods, computer program products, and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for aerial image processing and object identification using an electronic computing device, the method comprising:
    causing the electronic computing device to build a deep learning model comprising:
        receiving a plurality of training images, the training images including a plurality of known objects;
        pre-processing the plurality of training images to clean and texture map the plurality of training images; and
        building the deep learning model;
    receiving actual aerial image data;
    applying the deep learning model to the actual aerial image data to identify areas of interest;
    post-processing the areas of interest; and
    returning a plurality of classified objects corresponding with the areas of interest to a user.

2. The method of claim 1, further comprising:
    applying global positioning system (GPS) mapping to the plurality of classified objects with respect to the actual aerial image data.

3. The method of claim 2, wherein the receiving the actual aerial image data comprises:
    receiving a plurality of actual aerial image stacks;
    receiving GPS coordinate data corresponding with the plurality of actual aerial image stacks;
    receiving survey data corresponding with the plurality of actual aerial image stacks; and
    compiling the actual aerial image data.

4. The method of claim 3, wherein the post-processing the areas of interest comprises:
    clustering the areas of interest;
    applying surface area segmentation to the areas of interest; and
    classifying the areas into objects proximate with an associated pipeline.

5. The method of claim 4, wherein applying GPS mapping to the plurality of classified objects comprises:
    mapping GPS data to the plurality of actual aerial image stacks;
    calculating distances between the plurality of classified objects;
    calculating surface areas of the plurality of classified objects; and
    returning distances between the plurality of classified objects and the associated pipeline.

6. The method of claim 1, wherein the pre-processing the plurality of training images comprises:
    applying brightness control to the plurality of training images;
    applying edge detection to the plurality of training images; and
    applying texture filtering to the plurality of training images.

7. The method of claim 1, wherein the building the deep learning model comprises:
    receiving the pre-processed plurality of training images;
    applying a convolutional neural network for object detection; and
    storing the deep learning models.

8. A method for aerial image processing and object identification associated with a pipeline using an electronic computing device, the method comprising:
    causing the electronic computing device to build a deep learning model comprising;
        receiving a plurality of training images, the training images including a plurality of known objects;
        pre-processing the plurality of training images to clean and texture map the plurality of training images; and
        building the deep learning model;
    receiving actual aerial image data;
    applying the deep learning model to the actual aerial image data to identify areas of interest;
    post-processing the areas of interest; and
    returning a plurality of classified objects corresponding with the areas of interest.

9. The method of claim 8, further comprising:
    applying global positioning system (GPS) mapping to the plurality of classified objects with respect to the actual aerial image data and the pipeline.

10. A computing device program product for image processing and object identification using a computing device, the computing device program product comprising:
    a non-transitory computer readable medium;
    first programmatic instructions for causing the electronic computing device to build a deep learning model;
    second programmatic instructions for receiving actual aerial image data;
    third programmatic instructions for applying the deep learning model to the actual aerial image data to identify areas of interest;
    fourth programmatic instructions for post-processing the areas of interest; and
    fifth programmatic instructions for returning a plurality of classified objects corresponding with the areas of interest to a user, wherein the programmatic instructions are stored on the non-transitory computer readable medium,
    wherein the first programmatic instructions for causing the electronic computing device to build a deep learning model comprises:
    seventh programmatic instructions for receiving a plurality of training images, the training images including a plurality of known objects;
    eighth programmatic instructions for pre-processing the plurality of training images to clean and texture map the plurality of training images; and
    ninth programmatic instructions for building the deep learning model.

11. The computing device program product of claim 10, further comprising:
    sixth programmatic instructions for applying global positioning system (GPS) mapping to the plurality of classified objects with respect to the actual aerial image data.

12. The computing device program product of claim 11, wherein the second programmatic instructions for receiving the actual aerial image data comprises:
    sixteenth programmatic instructions for receiving a plurality of actual aerial image stacks;
    seventeenth programmatic instructions for receiving GPS coordinate data corresponding with the plurality of actual aerial image stacks;

eighteenth programmatic instructions for receiving survey data corresponding with the plurality of actual aerial image stacks; and nineteenth programmatic instructions for compiling the actual aerial image data.

13. The computing device program product of claim 12, wherein the fourth programmatic instructions for post-processing the areas of interest comprises:

twentieth programmatic instructions for clustering the areas of interest;

twenty-first programmatic instructions for applying surface area segmentation to the areas of interest; and twenty-second programmatic instructions for classifying the areas into objects proximate with an associated pipeline.

14. The computing device program product of claim 13, wherein the sixth programmatic instructions for applying GPS mapping to the plurality of classified objects comprises:

twenty-third programmatic instructions for mapping GPS data to the plurality of actual aerial image stacks;

twenty-fourth programmatic instructions for calculating distances between the plurality of classified objects;

twenty-fifth programmatic instructions for calculating surface areas of the plurality of classified objects; and twenty-sixth programmatic instructions for returning distances between the plurality of classified objects and the associated pipeline.

15. The computing device program product of claim 10, wherein the eighth programmatic instructions for pre-processing the plurality of training images comprises:

tenth programmatic instructions for applying brightness control to the plurality of training images;

eleventh programmatic instructions for applying edge detection to the plurality of training images; and twelfth programmatic instructions for applying texture filtering to the plurality of training images.

16. The computing device program product of claim 10, wherein the first programmatic instructions for building the deep learning model comprises:

thirteenth programmatic instructions for receiving the pre-processed plurality of training images;

fourteenth programmatic instructions for applying a convolutional neural network for object detection; and fifteenth programmatic instructions for storing the deep learning models.

\* \* \* \* \*